No. 891,628.  PATENTED JUNE 23, 1908.
D. B. MERRELL.
FERTILIZER DISTRIBUTER.
APPLICATION FILED FEB. 5, 1906.

2 SHEETS—SHEET 1.

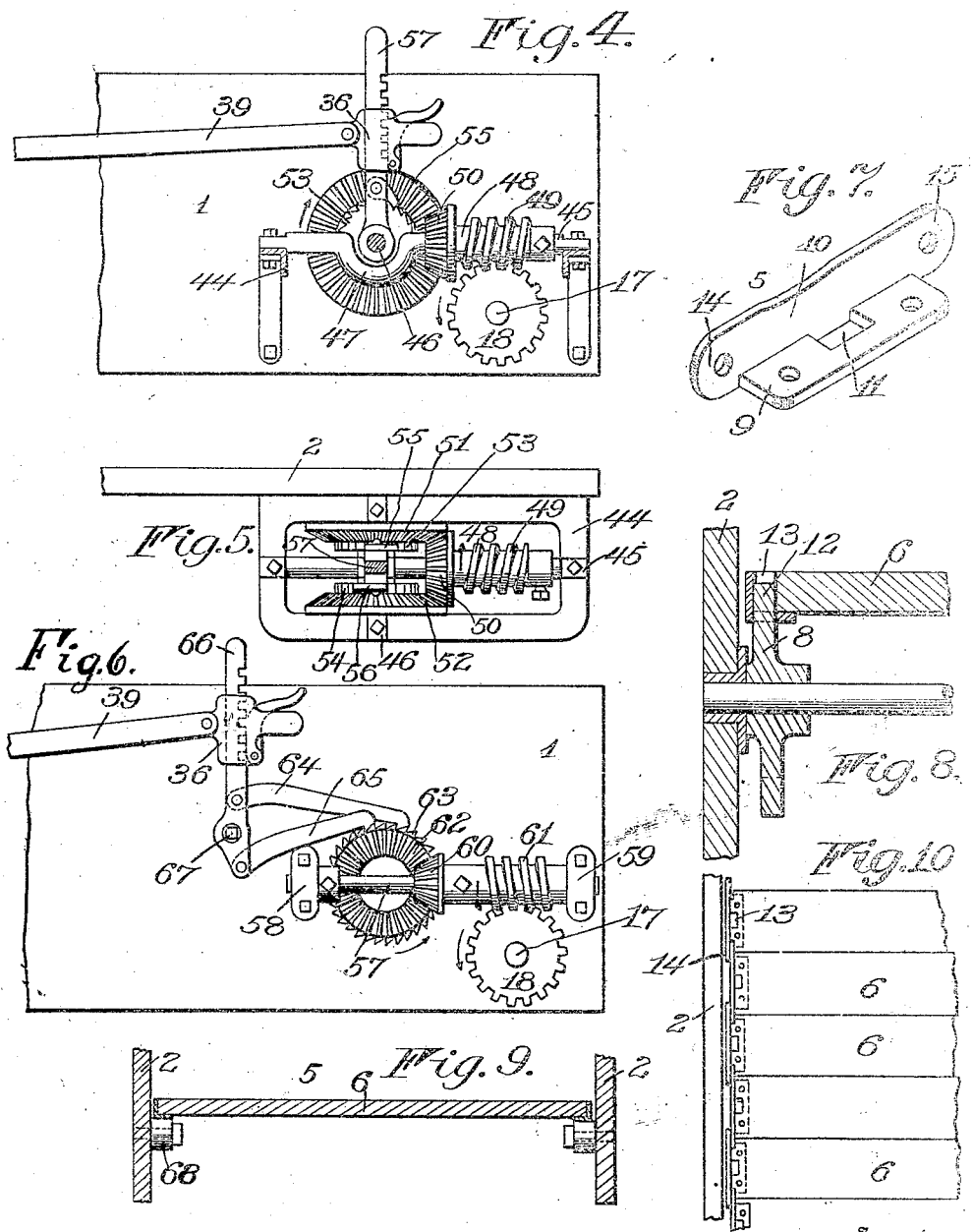

UNITED STATES PATENT OFFICE.

DANIEL B. MERRELL, OF COBLESKILL, NEW YORK.

FERTILIZER-DISTRIBUTER.

No. 891,623.

Specification of Letters Patent.

Patented June 23, 1908.

Application filed February 5, 1906. Serial No. 299,393.

*To all whom it may concern:*

Be it known that I, DANIEL B. MERRELL, of Cobleskill, in the county of Schoharie and State of New York, have invented certain new and useful Improvements in Fertilizer-Distributers; and I do hereby declare the following to be a full, clear, and exact description of the same, reference being had to the accompanying drawings, forming a part of this specification, and to the reference-numerals marked thereon.

My present invention relates to improvements in fertilizer distributers, and it has for its object to provide improved feed devices for operating the floor or carrier to advance the material to be distributed toward the beaters, the said devices being so constructed that uniformity of movement of the carrier will be preserved, although the machine may be operating on hilly ground, the particular object of the present invention being to provide against racing of the carrier when the ratchet and pawl devices are employed in the feed motion and the machine is operating on a grade.

To these and other ends the invention consists in certain new and useful improvements and combinations of parts all as will be hereinafter more fully explained, the novel features being pointed out in the claims at the end of the specification.

Figure 1:
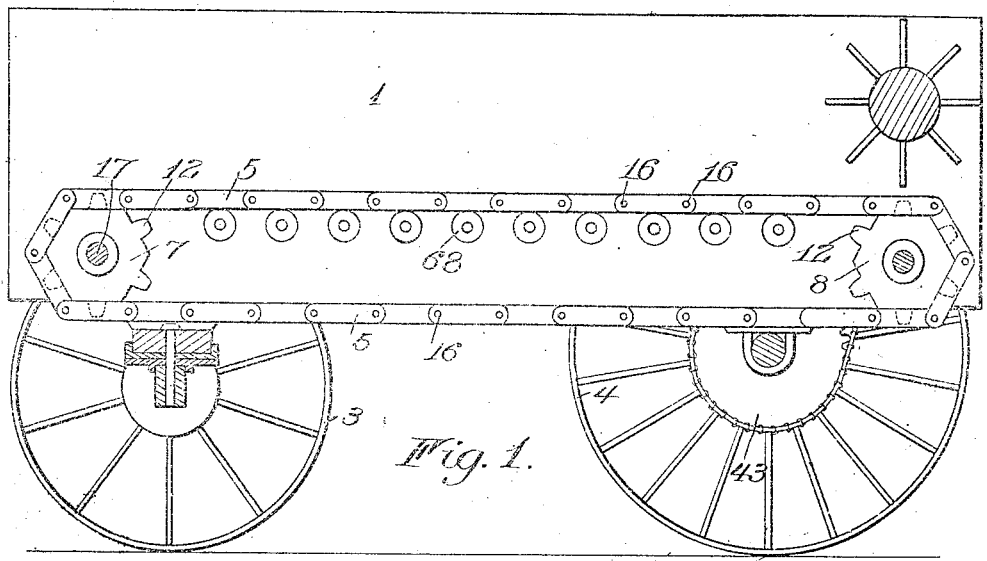
Figure 2:
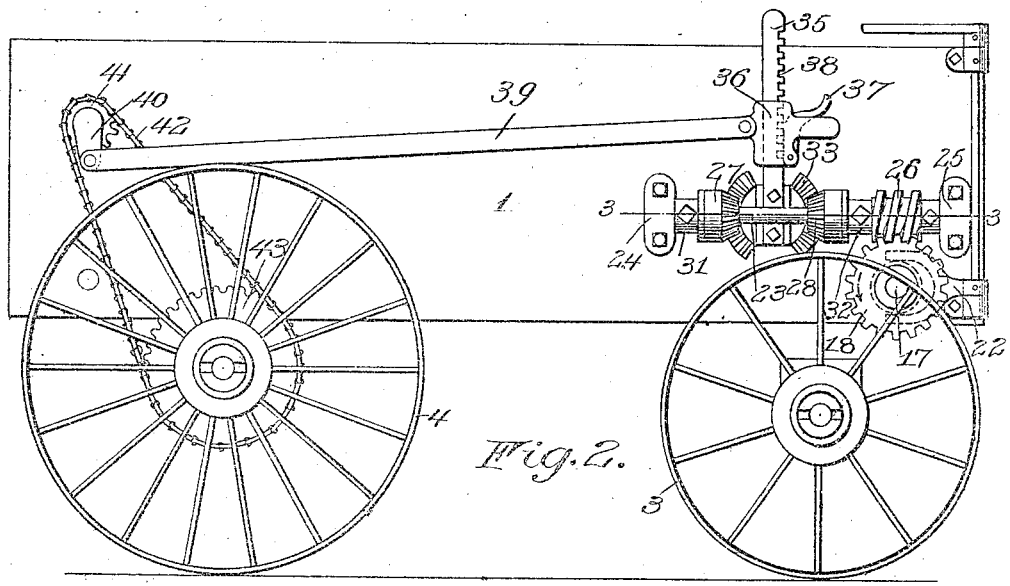
Figure 3:
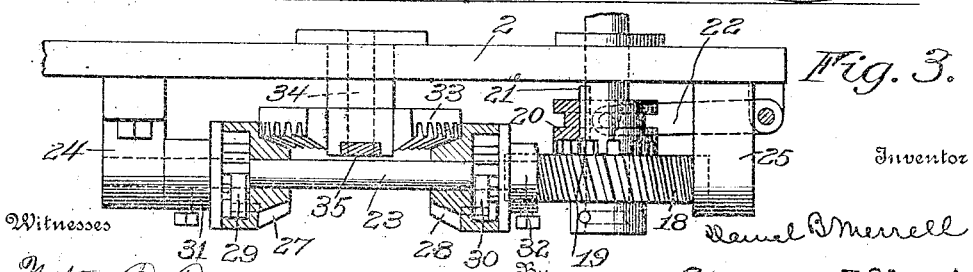

In the drawings: Figure 1 represents a longitudinal section through a distributer constructed in accordance with my invention. Fig. 2 is a side elevation of the machine shown in Fig. 1. Fig. 3 represents a horizontal section on the line 3—3 of Fig. 2, showing the feed devices in detail. Figs. 4 and 5 represent in elevation and plan respectively, a different way of applying the feed devices to the distributer. Fig. 6 represents another form of the invention. Figs. 7, 8 and 10 show an improved form of link which serves as a hinge connection between the boards or slats of the carrier, and Fig. 9 represents a transverse section across the body of the vehicle showing the manner of supporting the platform or carrier.

The same numerals of reference in the several figures indicate similar parts.

The present forms of my invention are shown in connection with a fertilizer distributer of that kind which is mounted on a wheeled body and adapted to be drawn over the surface of the ground or field in the path in which the fertilizer is to be distributed, a suitable form of distributer or spreader being employed for casting the fertilizer from the vehicle as it is fed rearwardly by the platform or carrier. Such a machine in the present forms of the invention comprises a suitable body 1, having the vertical sides 2, the load being supported on the forward and rear wheels 3 and 4, the latter being utilized for driving the various devices which operate during the spreading. Between the sides of the body is mounted a movable platform or carrier 5, that shown in the present form being an endless carrier made up of a plurality of sections or slats 6 extending transversely across the body between the sides thereof, the said slats being hinged together to permit them to pass over the sprocket wheels 7 and 8.

Any suitable form of hinge section may be employed between the sections of the carrier to render it flexible, but an improved construction is provided by the means shown in Figs. 7 and 8, wherein an angle member having the horizontal flange 9 and the vertical flange 10 is secured to each end of a section. The horizontal flange 9 of this angle member is provided with a notch 11 to coöperate with the teeth 12 on the sprocket wheel 7 and 8 and the angle member is secured to the sections by means of bolts or other securing devices which pass through the section and the horizontal flange 9, a notch 13 being provided in the section corresponding with the notch 11 of the angle member to accommodate the sprocket teeth. The vertical flange 10 of the angle member has its opposite ends extended beyond the end of the horizontal flange 9 to form hinge members, as indicated at 14 and 15, these hinge members being perforated to receive the rivets 16 which serve to join the adjacent angle members of the carrier.

The shaft 17 to which the sprockets 7 are fixed has a worm wheel 18 loosely mounted thereon, preferably at the outer side of the body, and this worm wheel has a clutch face 19 thereon adapted to coöperate with the corresponding clutch member 20 which is slidable axially of the shaft, but is caused to turn therewith by means of the spline 21, the worm wheel 18 being connected and disconnected in relation to the shaft by shifting the clutch member 20 by suitable means such as a lever 22.

The feed devices shown in Figs. 2 and 3 embody a shaft 23 journaled in bearings 24 and 25 secured to a suitable part of the body, the said shaft having a worm 26 fixed thereon and arranged to coöperate with the worm wheel 18 to operate it, and this shaft also carries a pair of oppositely-arranged pinions 27 and 28. These pinions are loosely mounted on the shaft and are adapted to be connected therewith by means of the ratchets 29 and 30 which are suitably interposed between their respective pinions and the collars 31 and 32, the latter being fixed to the shaft, the ratchet devices being arranged to form an operative connection between their respective pinions and the shaft when the pinions are operated in one direction, to permit the pinions to operate freely in the reverse direction. Coöperating with both pinions is a gear or segment 33 mounted to rotate on an axis 34, the said axis being arranged at a point intermediate between the pinions and preferably coincident with the apexes of their cones, so as this gear rotates in one direction, it will operate the pinion 27 in a proper direction to rotate the shaft 23, and when it is rotated in a reverse direction it will operate the pinion 28 to rotate the said shaft a second step, the pinion in each case which is not operating the shaft being permitted to rotate backwardly by the ratchet connection between it and the shaft. This wheel or segment 33 is provided with the rocker arm 35 adapted to receive the slide 36, the latter having a catch 37 thereon adapted to coöperate with the spaced notches 38 on the rocker arm to provide for adjusting the position of the slide longitudinally of the rocker arm. To this slide is attached a link 39 arranged to be reciprocated by a crank 40, and this crank is connected in any suitable way with the driving wheels, a sprocket wheel 41 being provided in the present instance over which the chain 42 passes, the chain in turn being operated by the sprocket wheel 43 driven from one of the driving wheels 4. As the machine is caused to move over the ground the driving wheels 4 will be operated, and through the chain 42 rotary motion will be transmitted to the crank 40, the latter in turn imparting reciprocatory motion to the link 39. As this link is connected to the slide 36, the latter is connected to the rocker arm 35, the reciprocatory motion of the link 39 will be utilized to produce a rocking movement of the gear 33, first in one direction and then in the reverse direction, and the rocking movement of this gear will be transmitted alternately through the pinions 27 and 28 to produce the rotation of the shaft 23 in the same direction. The worm 26 fixed to this shaft will transmit the motion thereof to the worm wheel 18, and through the clutch members 19 and 20 this motion will be transmitted to the shaft 17, carrying the sprocket wheel 7, and as these sprockets rotate, a rearward movement will be imparted to the platform or carrier 5, causing it to move the load of material contained by the body of the vehicle to be carried rearwardly and fed to the beater or spreading device. The relative rate of feed of material is governed by the movement of the carrier 5, and this may be regulated by setting the slide 36 at different positions on the rocker arm 35, the catch 37 serving to hold the slide and rocker arm in adjusted relation.

In Fig. 4 a modified construction of the invention is shown, a frame 44 being attached to the side of the body for supporting the intersecting shafts 45 and 46, the shaft 45 being provided with a bend 47 so as to clear the shaft 46. On the shaft 45 a sleeve 48 is loosely mounted, this sleeve carrying a worm 49 arranged to coöperate with the worm wheel 18 on the shaft 17, a pinion 50 being also fixed to the sleeve 48. On the shaft 46 are loosely mounted a pair of oppositely-arranged bevel gears 51 and 52, the latter engaging the pinion 50 at opposite sides, and each of these bevel gears is provided with a ratchet 53 and 54 with which are arranged to coöperate the pawls 55 and 56, each of these pawls being carried by the rocker arm 57 journaled on the shaft 46, a slide 36 having a connecting link 39 being also provided as shown in connection with the form illustrated in Fig. 2. As the rocker arm 57 is operated by the link 39, the pawls 55 and 56 will operatively engage alternately with their respective ratchet wheels 53 and 54, and as the rocker arm moves in one direction, the bevel gear 51 will be rotated to operate the pinion 50, while the gear 54 runs loose, and vice versa, the motion imparted to the pinion 50 causing the worm 49 to rotate the gear wheel 18, and in this way an intermittent motion is imparted to the carrier 5.

Fig. 6 illustrates another form of the invention embodying a shaft 57 journaled in the bearings 58 and 59 and having a pinion 60 and a worm 61 fixed thereto, the worm 61 being arranged to coöperate with the worm wheel 18, which is mounted on the shaft 17. Meshing with the pinion 60 is a gear 62 having a ratchet face 63 with which the pawls 64 and 65 coöperate, and these pawls are pivoted to a rocker arm 66 which is pivoted to the body at 67, so that as this arm is rocked about its center, the pawls 64 and 65 will operate in opposite directions, each engaging alternately with the ratchet face on the gear 62 to rotate it in a given direction, the motion being transmitted from the gear 62 through the pinion 60 in worm 61 to the worm wheel 18, and from the latter it is transmitted to the traveling carrier. The rocker arm in this construction may be operated in a manner similar to that described in connection with the form shown in Figs. 2 and 4, that is, the arm 66 may be provided with the adjustable slide 36, which receives its motion from the reciprocatory link 39. The angle members which are applied to the ends of the slats or sections of the carrier are so fitted that the vertical flanges 10 fit closely to the sides of the body, and at the inner sides of the body are provided the rows of supporting rollers 68, on which the horizontal flanges 9 on the angle members bear, and in this way a substantially continuous metallic bearing is provided for the movable platform or carrier, the sprockets 7 and 8 being in line with these rollers so that the angle members will pass over them when they leave the rollers.

My present invention provides a simple and efficient feed mechanism for operating the movable floor or carrier, the parts being simple and easily assembled, and in operation are not liable to get out of order, and it is particularly efficient when the vehicle is being operated over hilly ground, for while the ratchet and pawl devices are positively connected with the carrier when the operating devices are turning in one direction, the worm and worm wheel serve practically as a lock, and supposing a machine to be ascending a hill, the tendency of the carrier acted upon by the heavy load of material resting on it, will tend to move unduly toward the rear, this will be prevented by the worm and worm wheel which are of such a pitch that the turning force on the worm wheel 18 cannot rotate it, and in this case the carrier will be advanced only as fast as the ratchet and pawl devices operate. The improved construction for the floor sections also provides a simple and efficient connection whereby the sections are hinged together, and the links of the hinges serve as a chain for the sprocket wheels, as well as a bearing surface to coöperate with the antifriction rollers 68.

I claim as my invention:

1. In a fertilizer distributer, the combination with a suitable body carrying a movable carrier, and an operating shaft for the carrier, of feed mechanism for the carrier embodying a rocker arm, a slide adjustable longitudinally on said rocker arm and carrying a catch for engagement with the said rocking arm, a driving crank and an operative connection between said crank and slide for operating said rocker arm.

2. In a fertilizer distributer, the combination with a suitable body carrying a movable carrier, of feed mechanism for the carrier embodying an operating shaft, a worm wheel and worm connection with said shaft, a worm shaft carrying said worm, a pair of oppositely-arranged pinions having ratchet connections with said worm shaft, a gear coöperating with said pinions for operating them, and operating means for said gear.

3. In a fertilizer distributer, the combination with a suitable body carrying a movable carrier and an operating shaft for the carrier, of a feeding mechanism for the carrier embodying a worm wheel, a clutch interposed between the worm wheel, and the shaft, a worm coöperating with the said worm wheel, a rocker arm, a pair of ratchet and pawl devices interposed between the arm and the worm and adapted alternately to connect the arm with the worm, a slide adjustable longitudinally of said rocker arm, a crank geared to the running wheels of the distributer, and a link connecting the crank and the slide.

DANIEL B. MERRELL.

Witnesses:
WILLIAM H. GOLDING,
MARTIN W. HOOSE.